US011853319B1

(12) United States Patent
Kim et al.

(10) Patent No.: US 11,853,319 B1
(45) Date of Patent: Dec. 26, 2023

(54) CACHING UPDATES APPENDED TO AN IMMUTABLE LOG FOR HANDLING READS TO THE IMMUTABLE LOG

(71) Applicant: Amazon Technologies, Inc., Seattle, WA (US)

(72) Inventors: Jaemyung Kim, San Ramon, CA (US); Ashwin Venkatesh Raman, Toronto (CA); Dieu Quang La, Markham (CA)

(73) Assignee: Amazon Technologies, Inc., Seattle, WA (US)

( * ) Notice: Subject to any disclaimer, the term of this patent is extended or adjusted under 35 U.S.C. 154(b) by 197 days.

(21) Appl. No.: 17/213,126

(22) Filed: Mar. 25, 2021

(51) Int. Cl.
*G06F 16/00* (2019.01)
*G06F 16/27* (2019.01)
*G06F 16/23* (2019.01)
*G06F 16/2455* (2019.01)

(52) U.S. Cl.
CPC .......... *G06F 16/27* (2019.01); *G06F 16/2308* (2019.01); *G06F 16/2358* (2019.01); *G06F 16/24552* (2019.01)

(58) Field of Classification Search
CPC .. G06F 16/27; G06F 16/2308; G06F 16/2358; G06F 16/24552
See application file for complete search history.

(56) References Cited

U.S. PATENT DOCUMENTS 6,032,158 A 2/2000 Mukhopadhyay et al.
6,622,152 B1 9/2003 Sinn
6,889,231 B1 5/2005 Souder
7,076,508 B2 7/2006 Bourbonnais et al.
7,426,559 B2 9/2008 Hamel et al.
8,200,614 B2 6/2012 Syed et al.
8,374,966 B1 2/2013 Arora
8,510,270 B2 8/2013 Pareek et al.
8,943,282 B1 * 1/2015 Armangau ............ G06F 16/128 711/126
10,078,556 B2 9/2018 Clare et al.
10,582,001 B2 3/2020 Straub
2003/0225798 A1 12/2003 Norcott
2004/0010499 A1 1/2004 Ghosh
2004/0199552 A1 10/2004 Ward
2005/0009714 A1 1/2005 Chen et al.
2005/0125430 A1 6/2005 Souder
2005/0262305 A1 * 11/2005 Chow .................. G06F 12/023 711/E12.006
2009/0037422 A1 2/2009 Wong
2009/0300073 A1 12/2009 Bourbonnais
2014/0330784 A1 * 11/2014 Sundaram ............... G06F 16/27 707/639

(Continued)

OTHER PUBLICATIONS

U.S. Appl. No. 16/552,776, filed Aug. 27, 2019, Sangyong Hwang et al.

*Primary Examiner* — Alexander Khong
(74) *Attorney, Agent, or Firm* — S. Scott Foster; Kowert, Hood, Munyon, Rankin & Goetzel, P.C.

(57) ABSTRACT

Updates to an immutable log may be cached. An immutable log may be stored in a non-volatile storage and an end portion of the immutable log may be stored in a volatile storage as a cache. Reads to obtain records from the end portion of the log may be obtained from the cache instead of the non-volatile storage if the requested records are present in the cache.

20 Claims, 9 Drawing Sheets

Receive a request to read record(s) from an end portion of an immutable log that is stored in non-volatile storage and is written to append further records to the immutable log at the end portion of the immutable log
710

Determine whether the record(s) are stored in a separate cache for the immutable log that stores the end portion of the immutable log in volatile storage
720

Record(s) in cache?
730 no

Obtain the record(s) from the immutable log in the non-volatile storage
732 yes

Obtain the record(s) from the cache of the immutable log in the volatile storage
740

Return the records(s)
750

(56) References Cited

U.S. PATENT DOCUMENTS

2015/0310057 A1* 10/2015 Fu ......................... G06F 16/951
707/690
2016/0004718 A1* 1/2016 Lin ..................... G06F 11/1004
707/690
2016/0110439 A1 4/2016 Hrle et al.
2016/0171070 A1 6/2016 Hrle et al.
2017/0017692 A1* 1/2017 Das ..................... G06F 16/2453
2017/0322993 A1 11/2017 Brodt
2017/0371968 A1* 12/2017 Horowitz ............ G06F 11/1469
2019/0079834 A1* 3/2019 De Schrijver .......... G06F 16/27
2019/0079965 A1 3/2019 Pareek et al.
2019/0238653 A1 8/2019 Syomichev et al.
2020/0057722 A1* 2/2020 Wang .................. G06F 12/0895
2020/0320059 A1 10/2020 Kumar et al.
2020/0356474 A1* 11/2020 Doddameti ......... G06F 16/9027

* cited by examiner

CACHING UPDATES APPENDED TO AN IMMUTABLE LOG FOR HANDLING READS TO THE IMMUTABLE LOG

BACKGROUND

Database replication techniques offer users the opportunity to replicate changes made to one database across different locations, systems, services or devices, providing, among other features wide availability and accessibility of data stored in a database. Database replication techniques, however, are not implemented without costs. In order to ensure consistency with replicas of the database features, such as replication logging may be implemented in addition to the features that support the source database workload to perform, among many other operations, transactions or other updates to the source database.

Figure 1A:
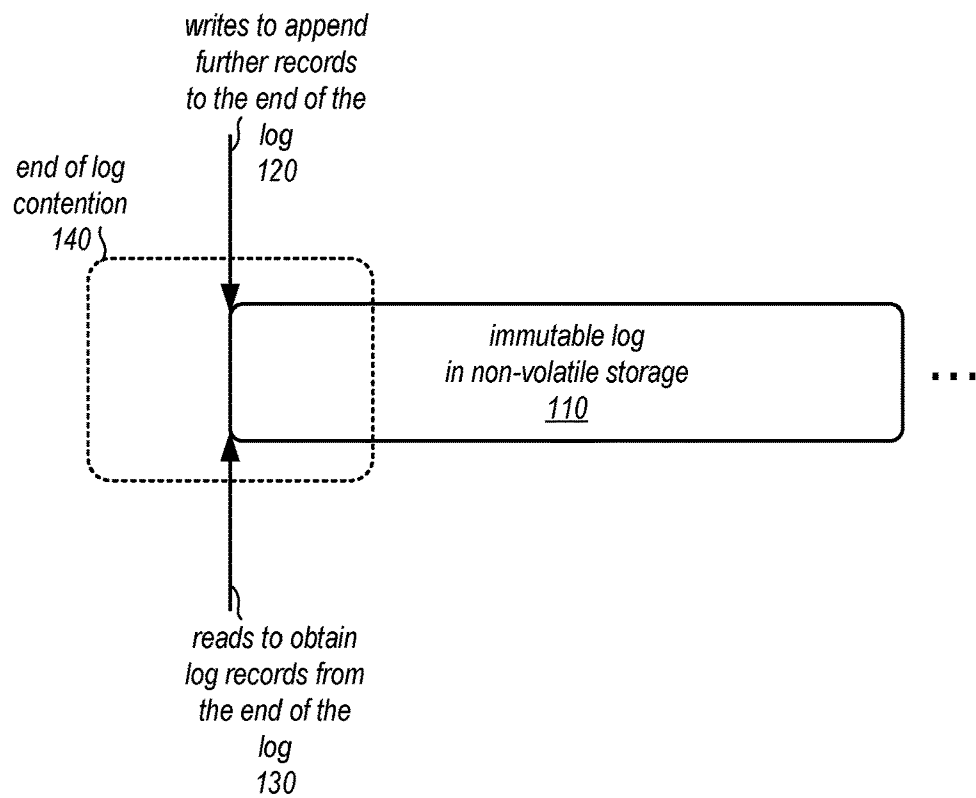
FIG. 1A is a logical block diagram illustrating an immutable log, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various techniques for caching updates to an immutable log for handling reads to the immutable log are described. Immutable, append-only logs may record data for various types of application that may take advantage of the ordering enforced by the log being immutable and append only. For example, immutable, append-only logs may be used as replication logs for database technologies, such as MySQL's Binlog feature, and may support various types of applications that utilize additional copies of a database, such as additional read copies, Change Data Capture, and database migration, which may rely upon the ordering of updates completed to the database as described in replication log. When replication logging is enabled, a database may copy all updates (e.g., individual item updates or transaction data including multiple updates) into the replication log on commit of the updates, in various embodiments. In this way, the replication log can be replayed, applied, or otherwise used to catch-up a replica of the database.

Because both reads of the immutable log (e.g., replicas of a database reading from a replication log) and writers to the immutable log (e.g., a database engine attempting to record writes completed to the database), contention at the end portion (sometimes referred to as a tail portion) of the log can slow down the performance of writers and readers (e.g., as both may have to wait on a lock, such as a mutex, in order to be able to access the desired portion of the immutable log). For instance, in a database system that has a large write workload (e.g., recording transactions, such as in an online transaction processing (OLTP) style database), contention at the end of a replication log could significantly slow down the performance of updates to the database, which may not be signaled as complete to a client until the replication log also includes the update. In these and other scenarios of conflict between reads and writes on the end portion of an immutable log, performance of a desirable workload (e.g., a write workload or other operation dependent upon accessing the immutable log) may degrade. In various embodiments, techniques for caching updates to an immutable log for handling reads to the immutable log may minimize the cost of conflicts at an immutable log, improving the performance of desirable workloads (e.g., such as updates to the database) while preserving the efficient performance of accessing the immutable workload for other workloads (e.g., reading from a replication log to keep replicas as near as current as possible).

FIG. 1A is a logical block diagram illustrating an immutable log, according to some embodiments. Immutable log in non-volatile storage 110 may, as discussed above, support various features of systems, services, or other applications that can utilize the ordering of data records in the immutable log 110 as a result of the log being immutable and append-only, in some embodiments. In order to keep immutable log persistent in the face of power failure, immutable log 110 may be stored in non-volatile storage (e.g., disk-based storage devices, flash-based storage devise (e.g., solid state drives (SSDs), battery backed or other persistent memory devices (e.g., non-volatile RAM, such as non-volatile dual inline memory modules (NVDIMMs)). As illustrated in FIG. 1A, both writes to append further records to the end of the log 120 and reads to obtain log records from the end of the log may be made to similar areas of immutable log 110 (e.g., similar blocks, pages, or bytes of non-volatile storage). Because non-volatile storage may provide slower (and sometimes significantly slower) access times when compared with volatile storage, contention at the end of the log, as indicated at 140, may have a very detrimental performance impact. Moreover, in many different systems, services, or applications, such as distributed systems like cloud providers or other highly distributed applications, non-volatile storage may be separated from the initiating writer and/or reader, incurring communication performance penalties (e.g., by making network requests to remote servers, systems, or devices, in order to read from and/or write to immutable log 110).

Figure 1B:
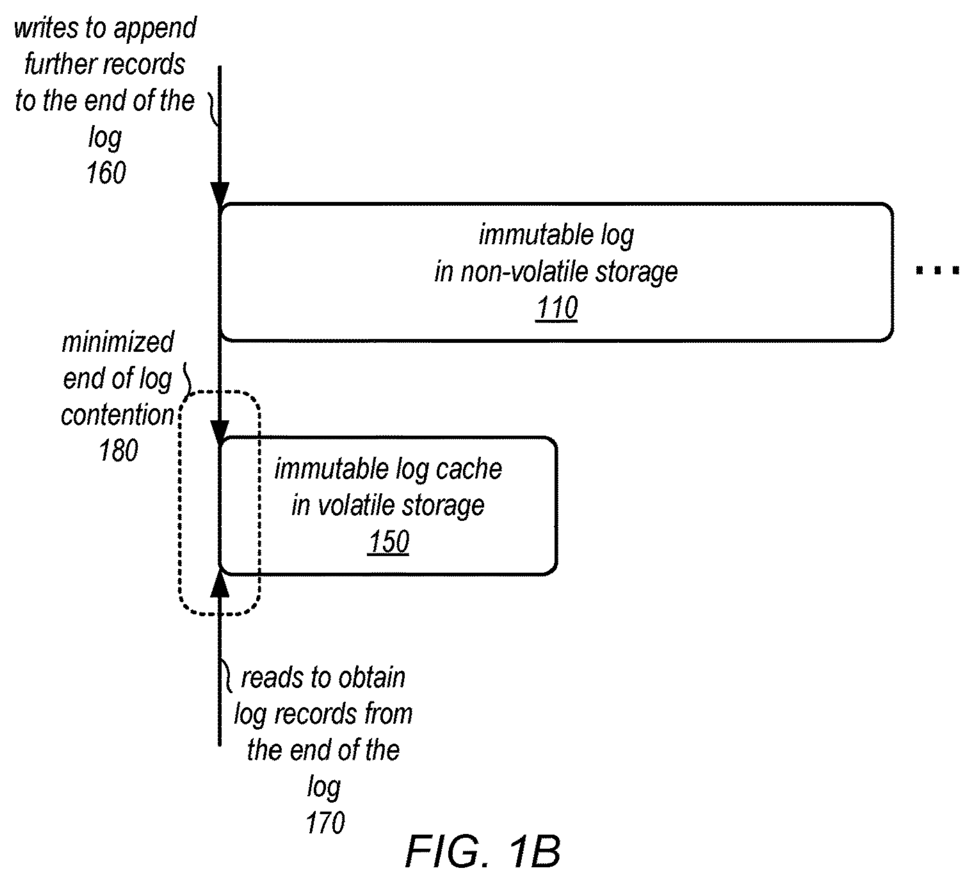
FIG. 1B is a logical block diagram illustrating caching updates to an immutable log for handling reads to the immutable log, according to some embodiments.

FIG. 1B is a logical block diagram illustrating caching updates to an immutable log for handling reads to the immutable log, according to some embodiments. As in FIG. 1A, immutable log 110 may be in non-volatile storage 110. However, a cache of a portion the immutable log, as indicated at 150, may also be implemented using volatile storage, in various embodiments. Writes 160 to immutable log 110 may be performed to both immutable log 110 and cache 150, in some embodiments (e.g., using write through or other caching strategies). Reads, as indicated at 170, may be made to the immutable log cache in volatile storage 150 (instead of non-volatile storage). In this way, contention at the end of the log may be minimized, as indicated at 180.

For example, the faster access times provided by volatile storage 150 would reduce the wait time for a request (e.g., a read or a write) when contention occurs. Moreover, in scenarios where non-volatile storage is remote, a local volatile storage cache 150 may eliminate network hops and other communication delays. As immutable log is still persisted in non-volatile storage, as indicated at 110, the immutable log may still survive power failures or requests for older records not maintained in cache 150. For example, as discussed in detail below with regard to FIGS. 5, 6, and 7, cache misses may only incur the performance cost of going to non-volatile storage. Moreover, efficient cache structures, such as the example in-memory buffer cache discussed below with regard to FIG. 6, may provide further performance optimizations, such as a minimized cache footprint and efficient locking techniques to avoid contention.

Please note, FIGS. 1A and 1B are provided as logical illustrations and are not intended to be limiting as to the physical arrangement, size, or number of components, modules, or devices to implement such features.

The specification first describes an example of a provider network that may implement a database service and storage service, according to various embodiments. Included in the description of the example network-based services to caching updates to an immutable log for handling reads to the immutable log. The specification then describes a flowchart of various embodiments of methods caching updates to an immutable log for handling reads to the immutable log. Next, the specification describes an example system that may implement the disclosed techniques. Various examples are provided throughout the specification.

Figure 2:
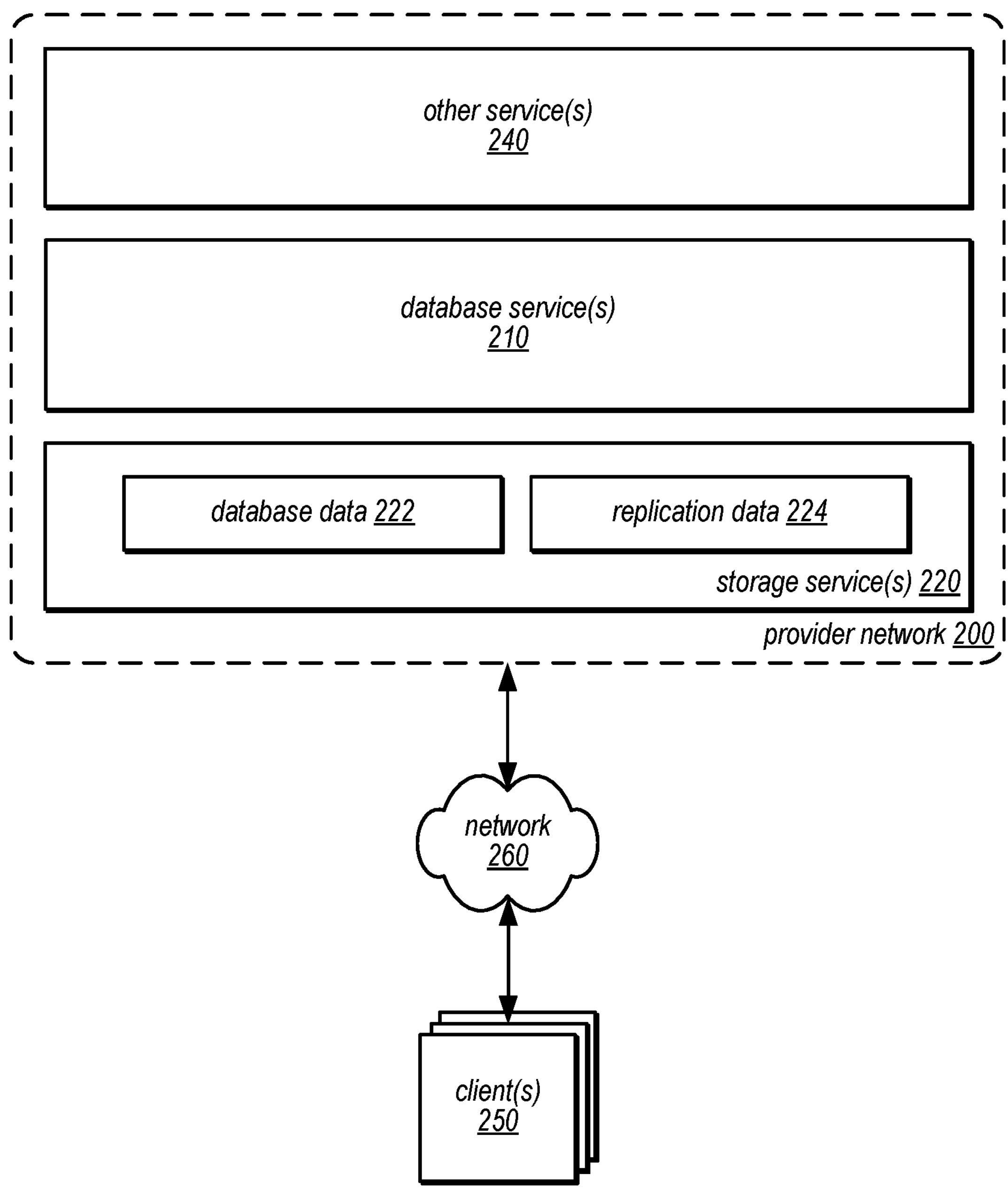
FIG. 2 is a logical block diagram illustrating a provider network that implements a database service and separate storage service that implements caching updates to an immutable log for handling reads to the immutable log, according to some embodiments.

FIG. 2 is a logical block diagram illustrating a provider network that implements a database service and separate storage service that implements caching updates to an immutable log for handling reads to the immutable log, according to some embodiments. Provider network 200 may be set up by an entity such as a company or a public sector organization to provide one or more services (such as various types of cloud-based computing or storage) accessible via the Internet and/or other networks to clients 250. Provider network 200 may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 200.

In some embodiments, provider network 200 may implement various network-based services, including database service(s) 210, a storage service(s) 220, and/or one or more other virtual computing services 240 (which may include various other types of storage, processing, analysis, communication, event handling, visualization, and security services). Database service(s) 210 may implement various types of database systems and formats (e.g., relational, non-relational, graph, document, time series, etc.) and the respective types of query engines to perform queries to those databases. Storage service(s) 220 may include many different types of data stores, including a log-structured storage service or other storage services as discussed below with regard to FIGS. 3 and 4, in some embodiments and may store both database data 222 and replication data 224.

Clients 250 may access these various services offered by provider network 200 via network 260. Likewise network-based services may themselves communicate and/or make use of one another to provide different services. For example, storage service 220 may store data 222 for databases managed by database service 210, in some embodiments. It is noted that where one or more instances of a given component may exist, reference to that component herein may be made in either the singular or the plural. However, usage of either form is not intended to preclude the other In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., a request to execute a transaction or query with respect to a database, a request to manage a database, such as a request to enable or disable performing queries across different types of query engines, etc.). For example, a given client 250 may include a suitable version of a web browser, or may include a plug-in module or other type of code module that can execute as an extension to or within an execution environment provided by a web browser. Alternatively, a client 250 (e.g., a database service client) may encompass an application, a web server, a media application, an office application or any other application that may make use of provider network 200 to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with network-based services platform 200. In some embodiments, client 250 may generate network-based services requests according to a Representational State Transfer (REST)-style network-based services architecture, a document- or message-based network-based services architecture, or another suitable network-based services architecture. In some embodiments, a client of database service(s) 210 may be implemented within provider network 200 (e.g., on another service 240, such as virtual computing service).

In some embodiments, a client 250 (e.g., a database service client) may provide access to a database hosted in database service 210 to other applications in a manner that is transparent to those applications. For example, client 250 may integrate with an operating system or file system to provide storage in accordance with a suitable variant of the storage models described herein. However, the operating system or file system may present a different storage interface to applications, such as a conventional file system hierarchy of files, directories and/or folders, in one embodiment. In such an embodiment, applications may not need to be modified to make use of the storage system service model. Instead, the details of interfacing to provider network 200 may be coordinated by client 250 and the operating system or file system on behalf of applications executing within the operating system environment.

Client(s) 250 may convey network-based services requests (e.g., a request to query a database or perform a transaction at a database) to and receive responses from services implemented as part of provider network 200 via network 260, in some embodiments. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. For example, clients 250 may be provisioned within the same enterprise as a database service system (e.g., a system that implements database service 210 and/or storage service 220). In such a case, clients 250 may communicate with provider network 200 entirely through a private network 260 (e.g., a LAN or WAN that may use Internet-based communication protocols but which is not publicly accessible).

Services within provider network 200 (or provider network 200 itself) may implement one or more service endpoints to receive and process network-based services requests, such as requests to access data pages (or records thereof), in various embodiments. For example, provider network 200 services may include hardware and/or software to implement a particular endpoint, such that an HTTP-based network-based services request directed to that endpoint is properly received and processed, in one embodiment. In one embodiment, provider network 200 services may be implemented as a server system to receive network-based services requests from clients 250 and to forward them to components of a system within database service 210, storage service 220 and/or another virtual computing service 240 for processing.

In some embodiments, provider network 200 (or the services of provider network 200 individually) may implement various user management features. For example, provider network 200 may coordinate the metering and accounting of user usage of network-based services, including storage resources, such as by tracking the identities of requesting clients 250, the number and/or frequency of client requests, the size of data tables (or records thereof) stored or retrieved on behalf of user, overall storage bandwidth used by users or clients 250, class of storage requested by users or clients 250, or any other measurable user or client usage parameter, in one embodiment. In one embodiment, provider network 200 may also implement financial accounting and billing systems, or may maintain a database of usage data that may be queried and processed by external systems for reporting and billing of client usage activity. In some embodiments, provider network 200 may be to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 230 (or the underlying systems that implement those services).

In some embodiments, provider network 200 may also implement user authentication and access control procedures. For example, for a given network-based services request to access a particular database, provider network 200 may implement administrative or request processing components that may ascertain whether the client 250 associated with the request is authorized to access the particular database. Provider network 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, provider network 200 may reject the corresponding network-based services request, for example by returning a response to the requesting client 250 indicating an error condition, in one embodiment. Various access control policies may be stored as records or lists of access control information by database service 210, storage service 220 and/or other virtual computing services 230, in one embodiment.

Figure 3:
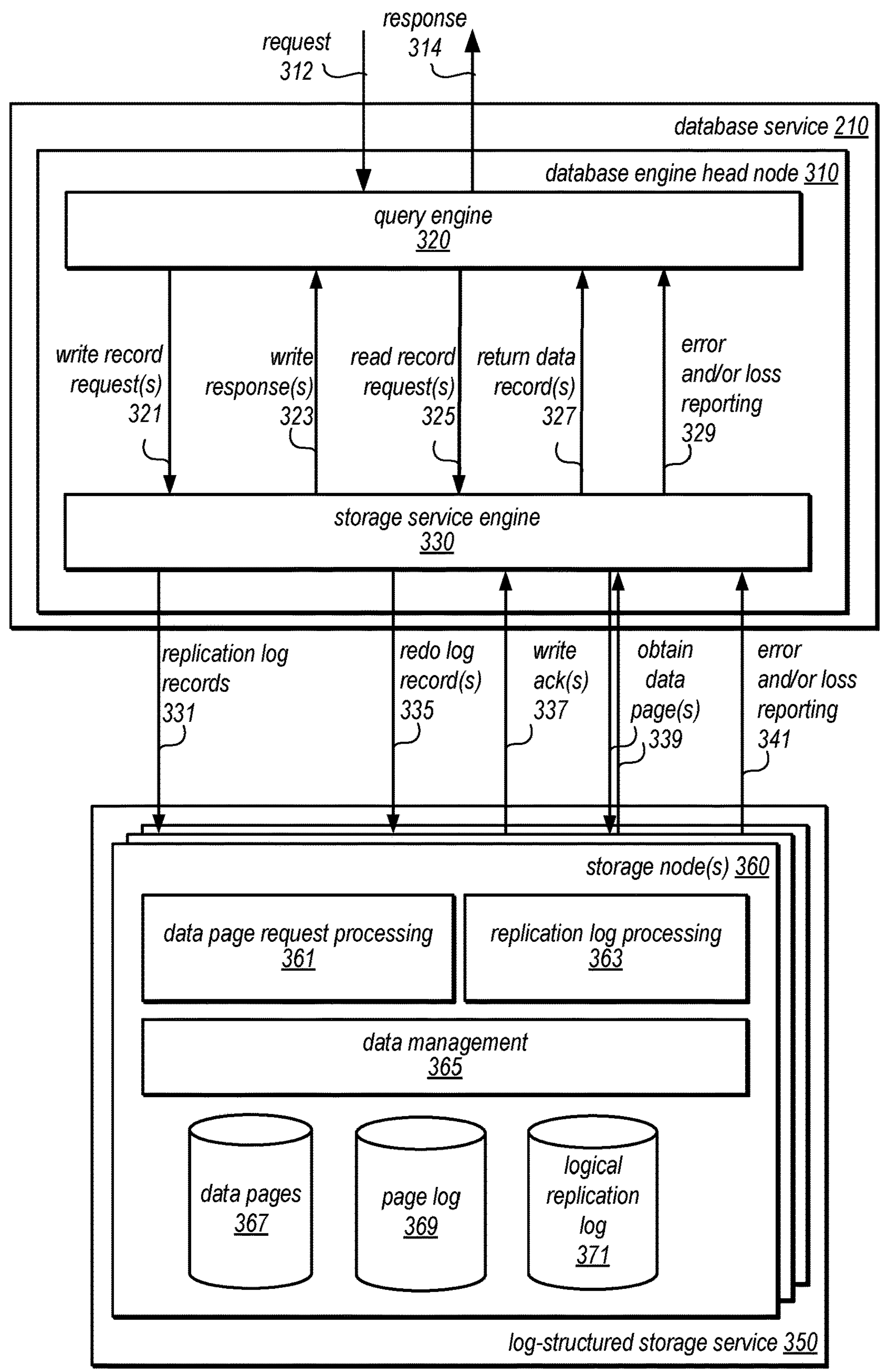
FIG. 3 is a logical block diagram illustrating various components of a database service and separate storage service, according to some embodiments.

FIG. 3 is a logical block diagram illustrating various components of a database service and separate storage service, according to some embodiments. Database service 210 may implement one or more different types of database systems with respective types of query engines for accessing database data as part of the database. In the example database system implemented as part of database service 210, a database engine head node 310 may be implemented for each of several databases and a log-structured storage service 350 (which may or may not be visible to the clients of the database system). Clients of a database may access a database head node 310 (which may be implemented in or representative of a database instance) via network utilizing various database access protocols (e.g., Java Database Connectivity (JDBC) or Open Database Connectivity (ODBC)). However, log-structured storage service 350, which may be employed by the database system to store data pages of one or more databases (and redo log records and/or other metadata associated therewith) on behalf of clients, and to perform other functions of the database system as described herein, may or may not be network-addressable and accessible to database clients directly, in different embodiments. For example, in some embodiments, log-structured storage service 350 may perform various storage, access, change logging, recovery, log record manipulation, and/or space management operations in a manner that is invisible to clients of a database engine head node 310.

As previously noted, a database instance may include a single database engine head node 310 that implements a query engine 320 that receives requests, like request 312, which may include queries or other requests such as updates, deletions, etc., from various client programs (e.g., applications) and/or subscribers (users), then parses them, optimizes them, and develops a plan to carry out the associated database operation(s). Query engine 320 may return a response 314 to the request (e.g., results to a query) to a database client, which may include write acknowledgements, requested data pages (or portions thereof), error messages, and or other responses, as appropriate. As illustrated in this example, database engine head node 310 may also include a storage service engine 330 (or client-side driver), which may route read requests and/or redo log records to various storage nodes within log-structured storage service 350, receive write acknowledgements from log-structured storage service 350, receive requested data pages from log-structured storage service 350, and/or return data pages, error messages, or other responses to query engine 320 (which may, in turn, return them to a database client).

In this example, query engine 320 or another database system management component implemented at database engine head node 310 (not illustrated) may manage a data page cache, in which data pages that were recently accessed may be temporarily held. Query engine 320 may be responsible for providing transactionality and consistency in the database instance of which database engine head node 310 is a component. For example, this component may be responsible for ensuring the Atomicity, Consistency, and Isolation properties of the database instance and the transactions that are directed that the database instance, such as determining a consistent view of the database applicable for a query, applying undo log records to generate prior versions of tuples of a database. Query engine 320 may manage an undo log to track the status of various transactions and roll back any locally cached results of transactions that do not commit.

FIG. 3 illustrates various interactions to perform various requests, like request 312. For example, a request 312 that includes a request to write to a page may be parsed and optimized to generate one or more write record requests 321, which may be sent to storage service engine 330 for subsequent routing to log-structured storage service 350. In this example, storage service engine 330 may generate one or more redo log records 335 corresponding to each write record request 321, and may send them to specific ones of the storage nodes 360 of log-structured storage service 350. Log-structured storage service 350 may return a corresponding write acknowledgement 337 for each redo log record 335 (or batch of redo log records) to database engine head node 310 (specifically to storage service engine 330). Storage service engine 330 may pass these write acknowledgements to query engine 320 (as write responses 323), which may then send corresponding responses (e.g., write acknowledgements) to one or more clients as a response 314.

In another example, a request that is a query may cause data pages to be read and returned to query engine 320 for evaluation and processing or a request to perform query processing at log-structured storage service 350 may be performed. For example, a query could cause one or more read record requests 325, which may be sent to storage service engine 330 for subsequent routing to log-structured storage service 350. In this example, storage service engine 330 may send these requests to specific ones of the storage nodes 360 of log-structured storage service 350, and log-structured storage service 350 may return the requested data pages 339 to database engine head node 310 (specifically to storage service engine 330). Storage service engine 330 may send the returned data pages to query engine 320 as return data records 327, and query engine may then evaluate the content of the data pages in order to determine or generate a result of a query sent as a response 314. As discussed below with regard to FIG. 4, some requests to store replication log records 331 may be performed as part of performing replication log techniques (e.g., to amortize the transmission of replication records to a replication log).

In some embodiments, various error and/or data loss messages 341 may be sent from log-structured storage service 350 to database engine head node 310 (specifically to storage service engine 330). These messages may be passed from storage service engine 330 to query engine 320 as error and/or loss reporting messages 329, and then to one or more clients as a response 314.

In some embodiments, the APIs 331-341 of log-structured storage service 350 and the APIs 321-329 of storage service engine 330 may expose the functionality of the log-structured storage service 350 to database engine head node 310 as if database engine head node 310 were a client of log-structured storage service 350. For example, database engine head node 310 (through storage service engine 330) may write redo log records or request data pages through these APIs to perform (or facilitate the performance of) various operations of the database system implemented by the combination of database engine head node 310 and log-structured storage service 350 (e.g., storage, access, change logging, recovery, and/or space management operations).

Note that in various embodiments, the API calls and responses between database engine head node 310 and log-structured storage service 350 (e.g., APIs 321-329) and/or the API calls and responses between storage service engine 330 and query engine 320 (e.g., APIs 331-341) in FIG. 3 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine head node 310 and/or log-structured storage service 350.

In some embodiments, database data for a database of database service 210 may be organized in various logical volumes, segments, and pages for storage on one or more storage nodes 360 of log-structured storage service 350. For example, in some embodiments, each database may be represented by a logical volume, and each logical volume may be segmented over a collection of storage nodes 360. Each segment, which lives on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of storage, generally of fixed size. In some embodiments, each page may be a block of storage (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

As discussed above, log-structured storage service 350 may perform some database system responsibilities, such as the updating of data pages for a database, and in some instances perform some query processing on data. As illustrated in FIG. 3, storage node(s) 360 may implement data page request processing 361, replication log processing 363, and data management 365 to implement various ones of these features with regard to the data pages 367 and page log 369 of redo log records among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Data page request processing 361 may handle requests to return data pages of records from a database volume, and may perform operations to coalesce redo log records or otherwise generate a data pages to be returned responsive to a request. Replication log processing 363 may handle requests to store replication logs to transaction objects and update replication logs stored in or associated with logical replication log 371.

In at least some embodiments, storage nodes 360 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

Figure 4:
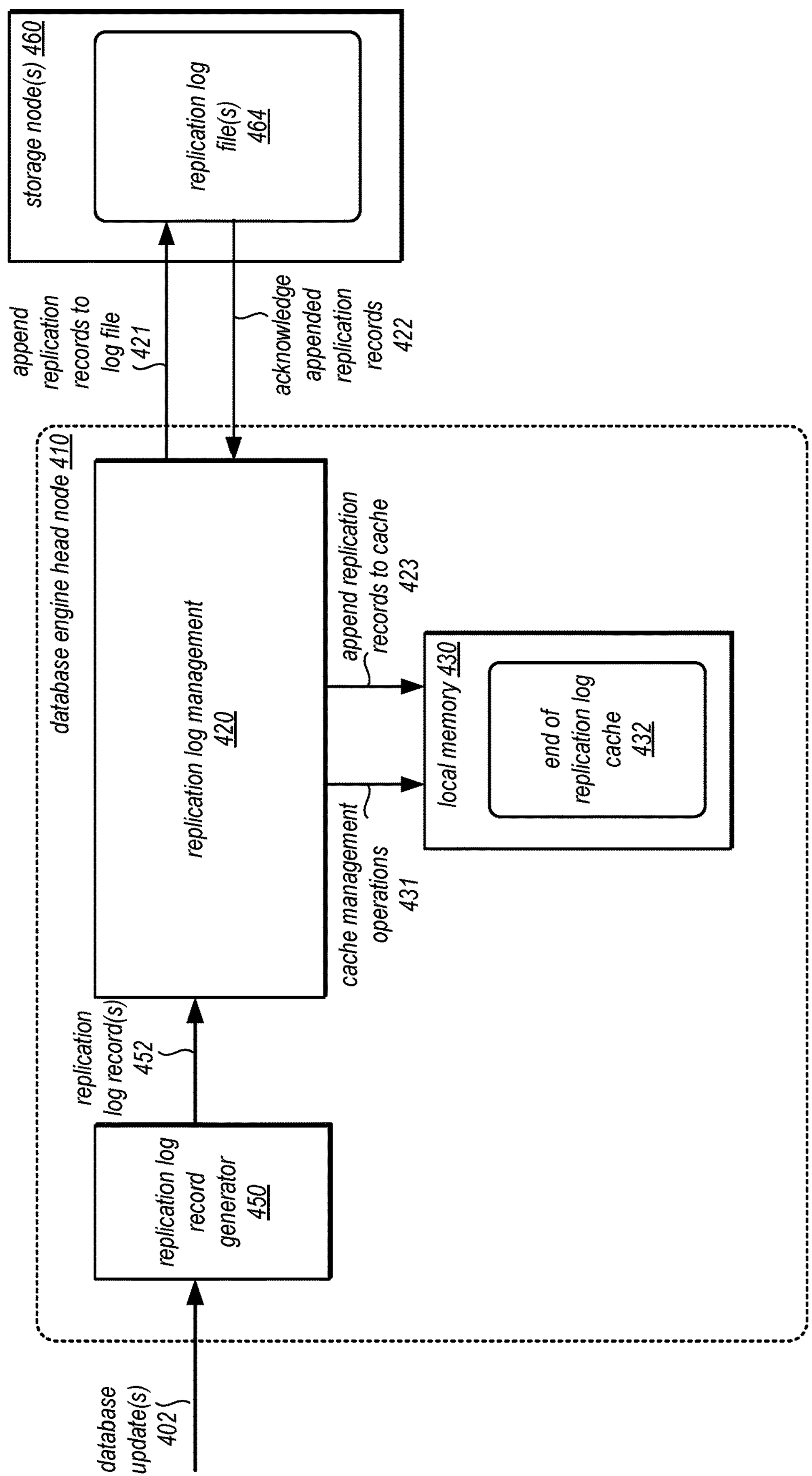
FIG. 4 is a logical block diagram illustrating capturing database updates in a replication log, according to some embodiments.

FIG. 4 is a logical block diagram illustrating capturing database updates in a replication log, according to some embodiments. Database engine head node 410 may implement replication log manager 420 which may perform various techniques to implement caching techniques for a replication log, as discussed in detail below with regard to FIGS. 4-8 and above with regard to FIG. 1. Caching may be enabled or disable in response to requests (e.g., made to a database service, head node or other component, such as replication log management 420. Transaction updates 402 may be received at replication log record generator 450 which may generate a log record that describes or indicates the update to the database as well as the associated transaction. In some embodiments, the replication log may be a logical replication log (e.g., describing the changes so that the changes can be performed). In other embodiments, the replication log may be a physical replication log (e.g., including a new record, field, item, or other value that stores the value after the update is applied). Replication log record generator 450 may support different types or formats of replication log records, which may be selectable in response to a request, in some embodiments.

Replication log records 452 may be provided to replication log manager 420 which may determine where to store and when to move replication log records 452, for instance according to the techniques discussed below with regard to FIGS. 4-8. Replication log manager 420 may perform requests 421 to append replication records to replication log file(s) 464 as part of or in response to a commit of database update(s) 402. Replication log manager 420 may update 421 local memory 430 to store replication log records in the corresponding end of replication log cache 432. Replication log management may also perform various cache management operations 431, such as increasing or decreasing the size of cache (e.g., in response to automatic management criteria or user requests via an interface). For example, other data stored in memory at database engine head node 410, such as a buffer pool cache that stores data pages of records that can be used to answer queries may need more space to store more pages. In response to such a scenario, the size of the cache 432 can be decreased to provide greater space for the buffer pool cache. Increasing or decreasing the size of cache 432 may include adding or evicting individual portions of data (e.g., evicting bytes of data at the oldest end of a circular log), or may include an operation to flush the current cache 432 and reallocate cache 432 at the different desired size (e.g., reallocated to be smaller or larger).

Figure 5:
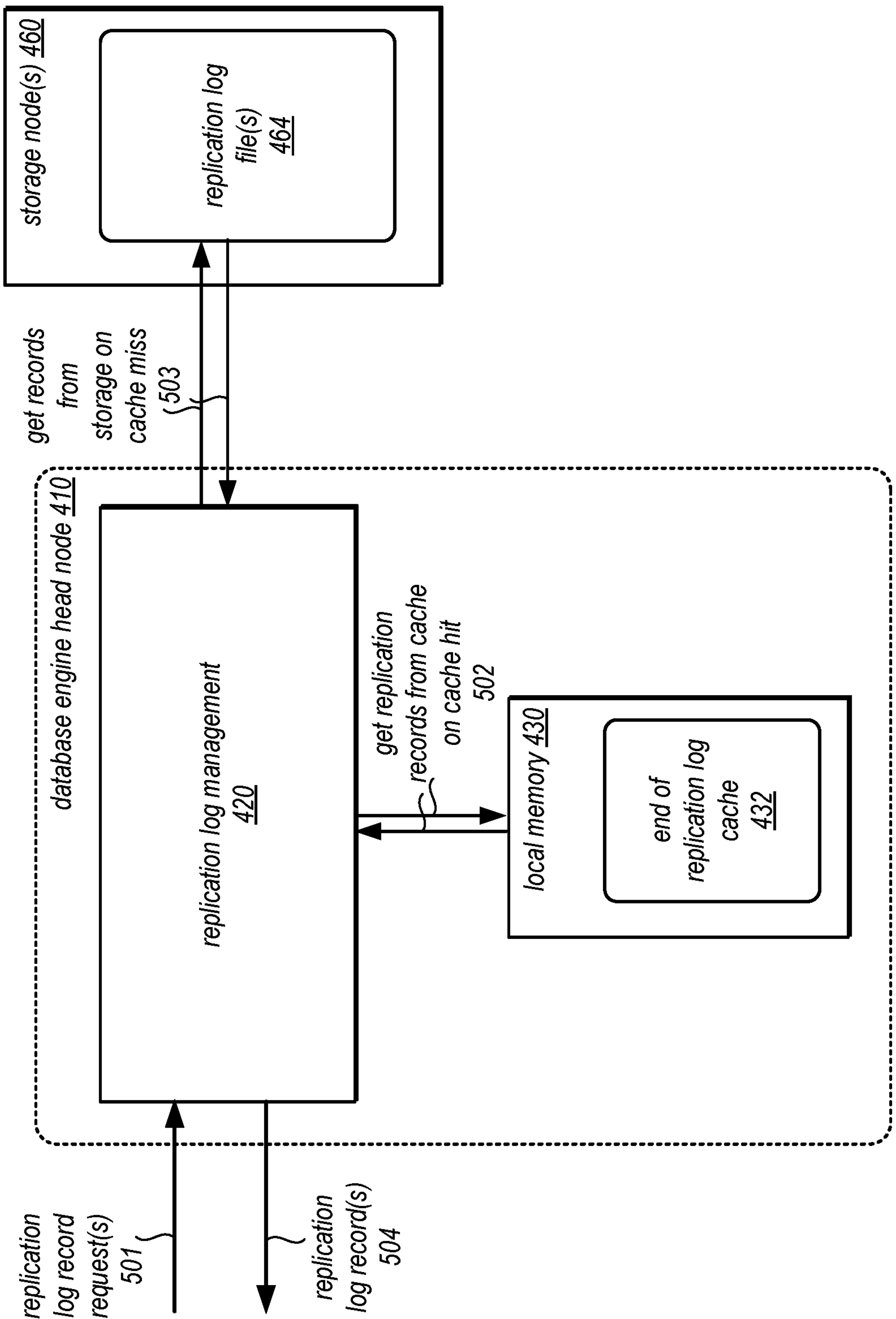
FIG. 5 is a logical block diagram illustrating requests to read from a replication log, according to some embodiments.

FIG. 5 is a logical block diagram illustrating requests to read from a replication log, according to some embodiments. Replication log management 420 may also receive replication log record requests 501 from, for instance, database replicas. replication log management 420 may check 502 local memory 430 first to determine whether the replication records are stored in cache 432 (e.g., a cache hit), as discussed in detail below with regard to FIG. 7. If not a cache hit, then replication log management 420 may get the records from replication log files 464, as indicated at 503. Replication log management may return replication log record(s) 504 in response to the request.

Figure 6:
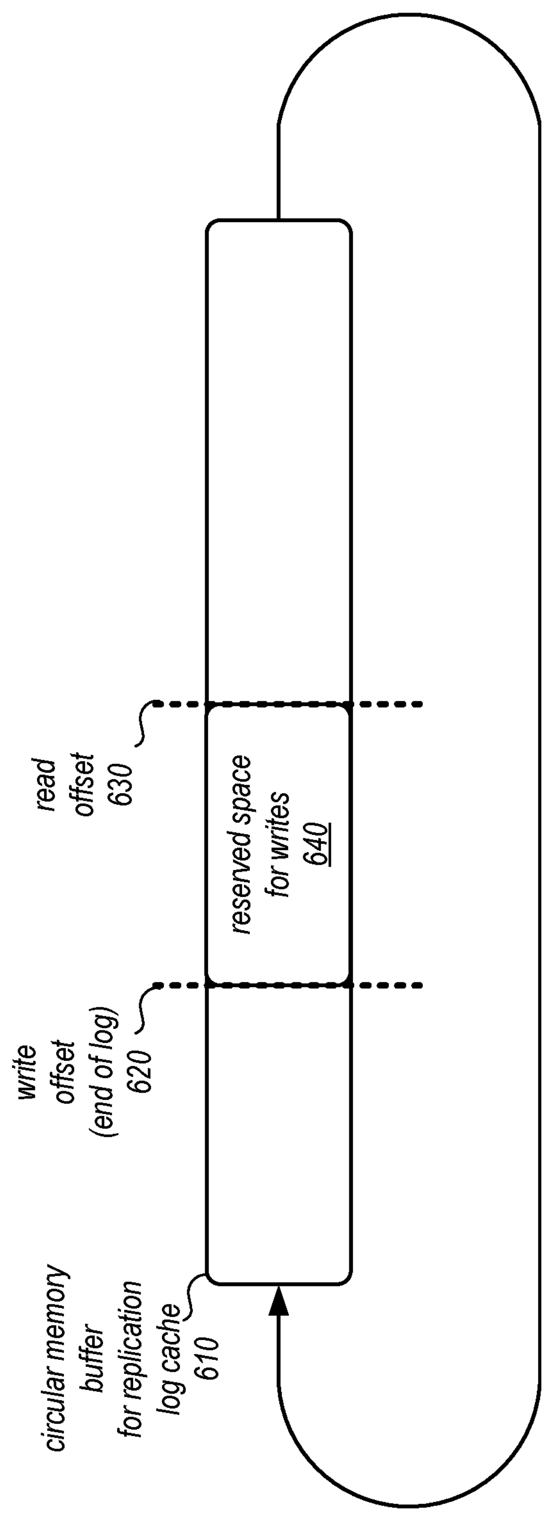
FIG. 6 is a logical block diagram illustrating an example cache for a replication log, according to some embodiments.

FIG. 6 is a logical block diagram illustrating an example cache for a replication log, according to some embodiments. In various embodiments, a circular memory buffer, as indicated at 610 may be implemented for a replication log (or other immutable, append only log cache). A hashing scheme may be used to index to the cache by identifying a byte location for a record (e.g., by hashing a file or other indicator for the record), which may be indicated by a read 630 or write offset 620. In some embodiments, space in the buffer 610 may be reserved or kept for writes, such as reserved space 640 (e.g., a number of adjacent bytes to write offset 620). In this way, lock operations for writing may be avoided (e.g., a lock-free write to append a record may be performed, although locks may be obtained by a separate background process/thread to reallocate pages from reserved space for writes 640 to be available for writing at the end of the log 620 and locks to reallocate pages to reclaim the data pages from the oldest portion of the log to maintain the reserved space 640 for writes at a same size). Other locking techniques, such as shared read locks may be implemented. Please note that other cache structures may be implemented, the previous discussion is not intended to be limiting to other cache embodiments.

Figure 7:
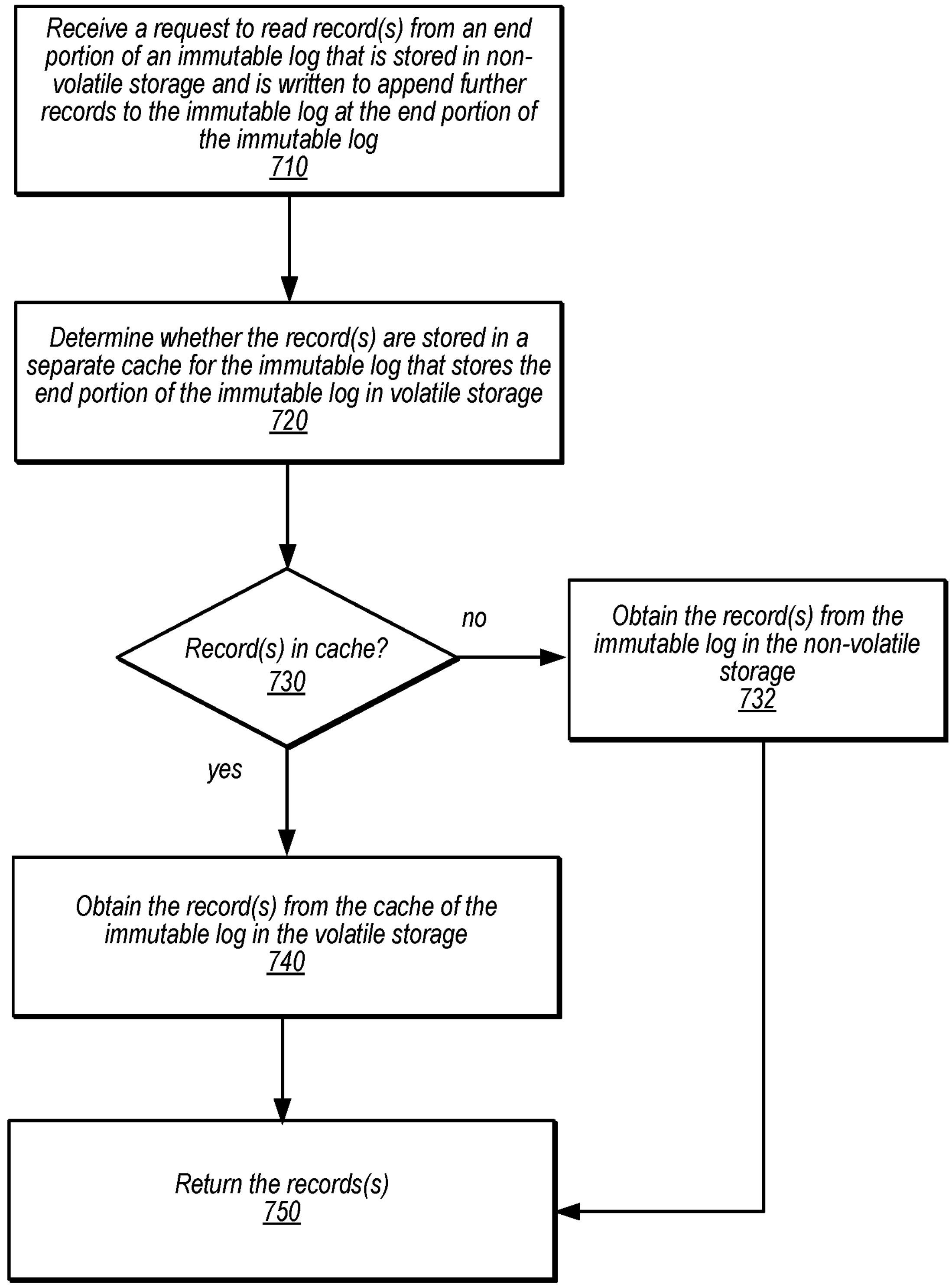
FIG. 7 is a high-level flow chart illustrating methods and techniques for handling reads to an immutable log using a separate cache for the immutable log, according to some embodiments.

The database service and storage service discussed in FIGS. 2 through 6 provide examples of a system that may perform amortizing replication log updates for transactions. However, various other types of data stores (e.g., non-log structured) or other storage engines may implement amortizing replication log updates for transactions. FIG. 7 is a high-level flow chart illustrating methods and techniques for handling reads to an immutable log using a separate cache for the immutable log, according to some embodiments. Various different systems and devices may implement the various methods and techniques described below, either singly or working together. For example, a database engine head node or storage node may implement the various methods. Alternatively, a combination of different systems and devices. Therefore, the above examples and or any other systems or devices referenced as performing the illustrated method, are not intended to be limiting as to other different components, modules, systems, or configurations of systems and devices.

As indicated at 710, a request may be received to read record(s) from an end portion of an immutable log that is stored in a non-volatile storage, in some embodiments. For example, the request may be from a database replica or other system, service or application that reads from the immutable log to determine a state of the system for which the immutable log is stored. The request to read from the end of the log may specify or include an offset, which may indicate how much of the log is to be returned. In some embodiments, the log size may be small enough that the entire log could be stored in the cache. As indicated at 720, a determination may be made as to whether the record(s) are stored in a separate cache for the immutable log that stores the end portion of the immutable log in volatile storage, in some embodiments. For example, various cache indexing schemes (e.g., hash values, etc.) may be applied to determine whether an entry exists and what the location (e.g., the read offset) of the entry may be. In some embodiments, the offset may indicate whether the records may be present in the cache. For example, the offset size is larger than the log size, then at least some of the log records may not be present in the cache. In such scenarios, either all log records (including those that would be present in the cache) may be obtained from the non-volatile storage, or those log records present in the cache may be returned from the cache and those log records present in the non-volatile storage may be returned from the non-volatile storage.

For records determined to be in the cache, as indicated by the positive exit from 730, the record(s) may be obtained from the cache of the immutable log in the volatile storage and, as indicated at 750, returned in response to the request. For records determined not to be in the cache (e.g., because of eviction), the records may be obtained from the immutable log in the non-volatile storage, as indicated at 732, in some embodiments. For example, a read request may be sent over a network connection to a storage device, server, system, service, or application, such as to a storage node as discussed above with regard to FIG. 5, to obtain the desired record(s). As indicated at 750, the records obtained from the immutable log in the non-volatile storage may then be returned in response to the request.

Figure 8:
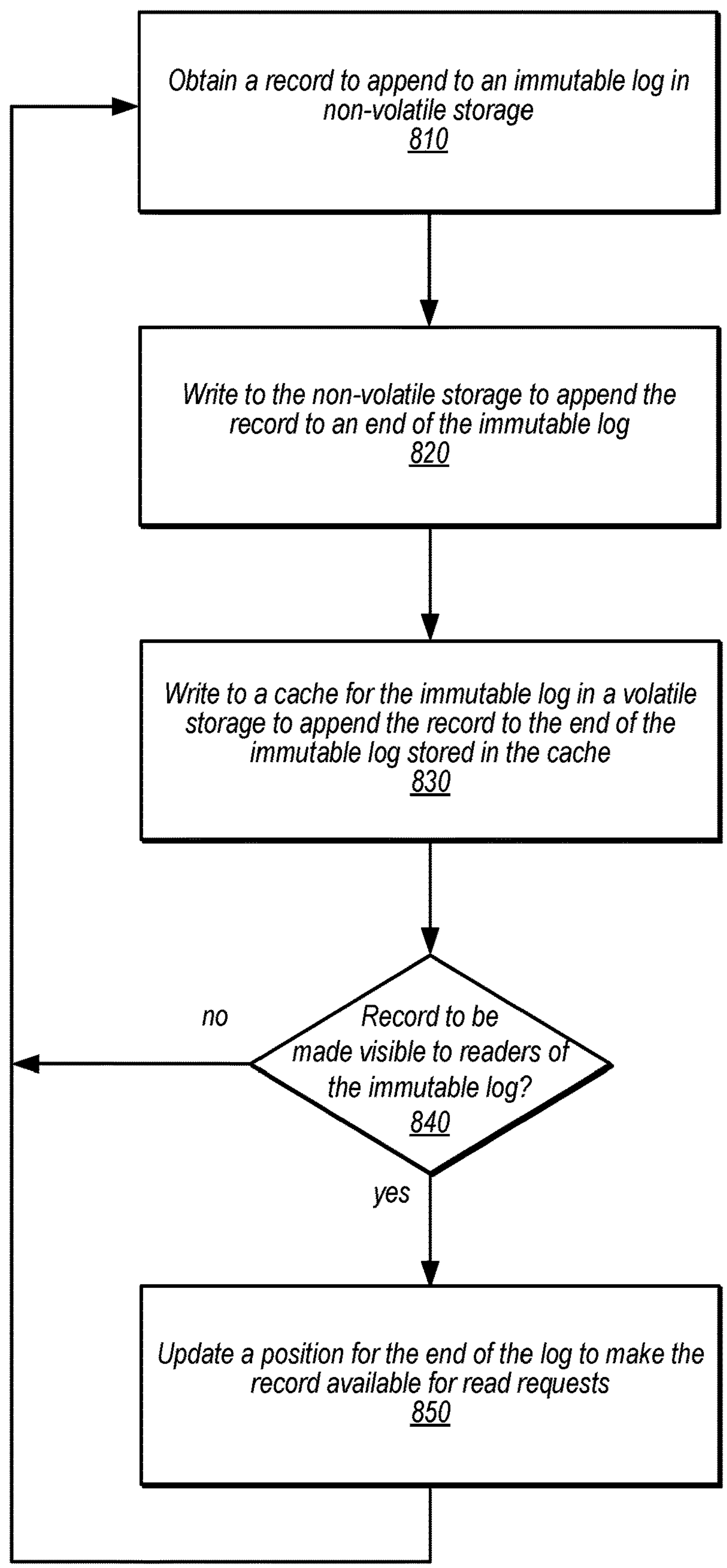
FIG. 8 is a high-level flow chart illustrating methods and techniques for caching updates to an immutable log for handling reads to the immutable log, according to some embodiments.

FIG. 8 is a high-level flow chart illustrating methods and techniques for caching updates to an immutable log for handling reads to the immutable log, according to some embodiments. As indicated at 810, a record may be obtained to append to an immutable log in a non-volatile storage, in some embodiments. For example, a database update may cause an replication log record to be created. In another example, a message, state indication, or other type of data recorded in the immutable log may be received. As indicated at 820, a write to the non-volatile storage may be performed to append the record to an end of the immutable log, in some embodiments. As indicated at 830, a write to a cache for the immutable log may be performed to append the record to the end of the immutable log stored in the cache, in some embodiments.

As indicated at 840, in some embodiments, a determination may be made as to whether the record is to be made visible to readers of the immutable log. For example, a transaction, such as a database transaction or other type of multi-operation transaction, may be performed that includes later operations corresponding which have not yet been completed. As a transaction semantic may enforce an all or nothing approach to the operations of the transaction, a record related to the transaction may not be visible until the transaction completes. A completed transaction associated with the record may, for instance, allow the record to be visible whereas an incomplete, failed, or ongoing transaction may not allow the record to be visible. As indicated at 850, for visible records a position for the end of the log may be updated to make the record available for read requests, in some embodiments. For example, the position may be provided to readers so that readers do not ask for records in a position beyond the end of the log, in some embodiments. For records not initially made visible other records may be received and written to the immutable log and cache and may allow for the record and the subsequent records to be visible (e.g., because the transaction completed).

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Figure 9:
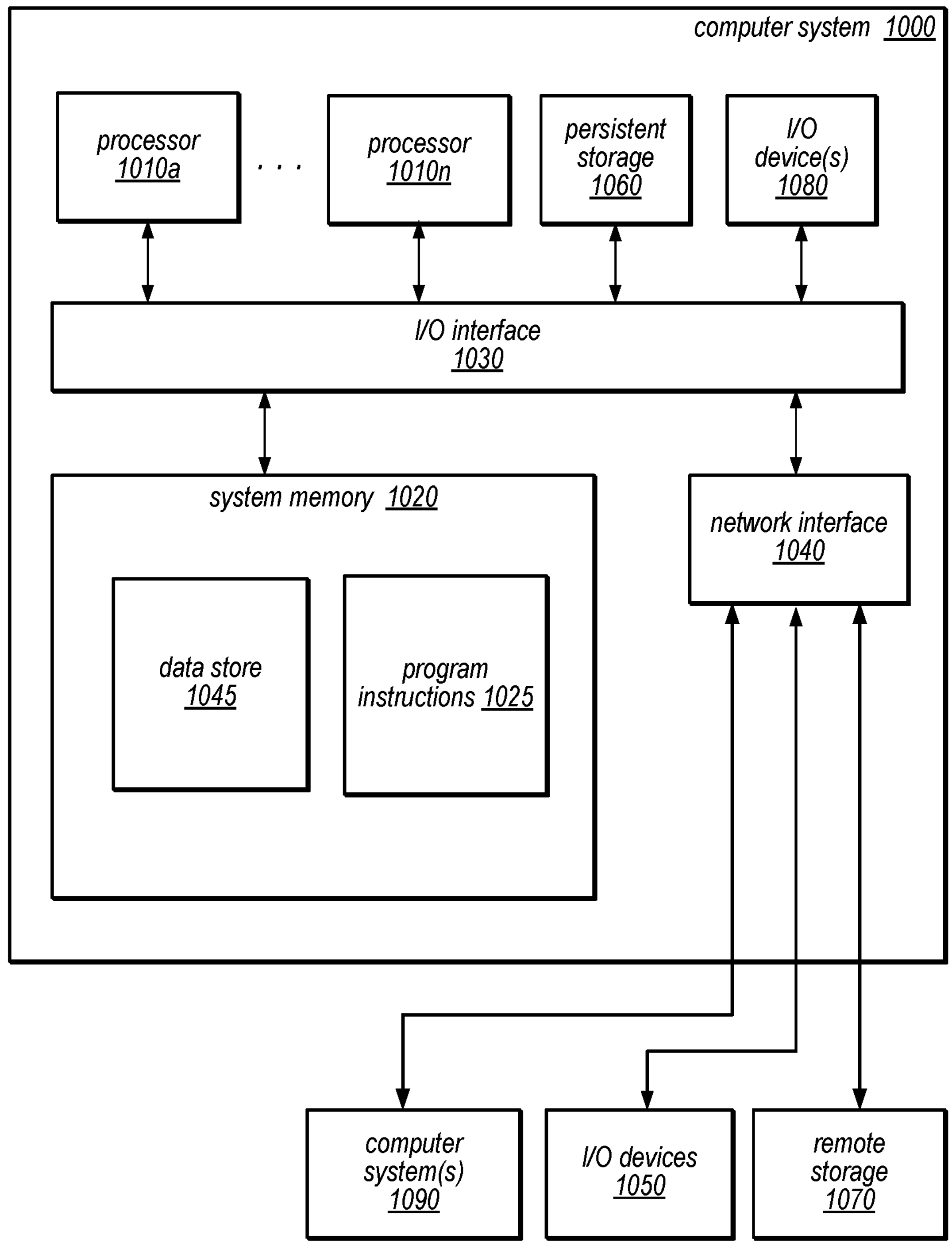
FIG. 9 is a block diagram illustrating a computer system that may implement at least a portion of systems described herein, according to some embodiments.

FIG. 9 is a block diagram illustrating a computer system that may implement at least a portion of the systems and techniques for handling reads to an immutable log using a separate cache for the immutable log described herein, according to various embodiments. For example, computer system 1000 may implement a database engine head node of a database tier, or one of a plurality of storage nodes of a separate distributed storage system that stores databases and associated metadata on behalf of clients of the database tier, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 660, as desired, and may retrieve the stored instruction and/or data as needed. For example, in some embodiments, computer system 1000 may host a storage node, and persistent storage 1060 may include the SSDs attached to that server node.

Computer system 1000 includes one or more system memories 1020 that may store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be implemented as described herein. For example, the information described herein as being stored by the database tier (e.g., on a database engine head node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, coalesced data pages, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:

at least one processor; and a memory, storing program instructions that when executed by the at least one processor, cause the at least one processor to implement a database system, configured to:

receive, from a replica of a database, a request to access one or more records of an immutable, replication log stored in a non-volatile storage for the database system, wherein the replication log comprises a plurality of log records that describe updates performed with respect to the database, wherein writes to add further records to the replication log append the further records to an end portion of the replication log as part of completing the updates to the database, wherein the end portion of the immutable, replication log is stored in a cache implemented in volatile storage in addition to the non-volatile storage;

determine that the one or more log records are in the end portion of the immutable, replication log stored in the volatile storage, wherein the end portion of the immutable, replication log is stored at a location in the volatile storage indicated by an offset;

determine that the request to access the one or more records of the immutable, replication log comprises a read request to read the one or more records;

based on the determination that the request to access the one or more records comprises the read quest and that the one or more log records are in the end portion of the replication log stored in the volatile storage implementing the cache, provide read access to the end portion of the replication log stored at the location in the volatile storage of the cache indicated by the offset to obtain the one or more records from the volatile storage implementing the cache; and return the one or more records obtained from the volatile storage implementing the cache to the replica of the database.

2. The system of claim 1, wherein the database system is further configured to:

receive an update to the database;

write a record that describes the update to the non-volatile storage to append the log record to the end portion of the replication log; and write the record that describes the update to the cache in the volatile storage to append the record to the end portion of the replication log stored in the cache.

3. The system of claim 1, wherein the database system is further configured to:

receive, from the replica of the database, a second request to read a different record from the end portion of the replication log;

access the end portion of the replication log in the non-volatile storage to obtain the different record responsive to a determination that the different record is not stored in the cache; and return the different record obtained from the non-volatile storage to the replica of the database.

4. The system of claim 1, wherein the database system is a database service implemented as part of a provider network, wherein the volatile storage is implemented on a database engine node in the database service, and wherein the non-volatile storage is implemented on one or more storage nodes stored as part of a separate storage service of the provider network.

5. A method, comprising:

receiving a request to read one or more records from an immutable log stored in a non-volatile storage, wherein writes to add further records to the immutable log append the further records to an end portion of the immutable log that is stored in the non-volatile storage and an in a volatile storage implementing a separate cache;

determining that the one or more records are located in the end portion of the immutable log stored in the non-volatile storage and the volatile storage of the cache, wherein the end portion of the immutable log is stored in the volatile storage implementing the cache at a location indicated by an offset; and in response to determining that the one or more records are located in the end portion of the immutable log stored in the volatile storage, returning the one or more records obtained from the immutable log in the volatile storage implementing the cache at the location indicated by the offset instead of obtaining the one or more records from the immutable log non-volatile storage.

6. The method of claim 5, further comprising:

obtaining a record to append to the immutable log in the non-volatile storage;

writing to the non-volatile storage to append the record to the end portion of the immutable log; and after writing to the non-volatile storage, writing to the cache for the immutable log in the volatile storage to append the record to the end portion of the immutable log.

7. The method of claim 6, further comprising:

responsive to determining that the record is to be made visible to readers of the immutable log, updating a position for the end portion of the log to make the record available for read requests.

8. The method of claim 7, wherein determining that the record is to be made visible to readers of the immutable log comprises determining that a transaction that caused the record to be appended to the immutable log is committed.

9. The method of claim 5, further comprising:

receiving a second request to read a different record from the end portion of an immutable log stored in the non-volatile storage;

determining that the different record is not stored in the cache for the immutable log; and returning the different record obtained from the non-volatile storage.

10. The method of claim 5, wherein the immutable log is a replication log that describes updates performed to a database, wherein the request for the one or more records is received from a replica of the database that obtains the one or more records to update the replica of the database.

11. The method of claim 10, further comprising creating the cache for the replication log responsive to a request to enable caching for the replication log.

12. The method of claim 5, wherein the cache is a circular buffer, wherein a write offset indicates a write location in the circular buffer to append the further records, wherein a read offset indicates a read location in the circular buffer to obtain the one or more records, wherein a portion of storage in the circular buffer adjacent to the write offset is blocked for reads in order to perform lock-free writes to append the further records.

13. The method of claim 5, wherein the writes to add the further records to the immutable log append the further records to the end portion of the immutable log are performed in order to complete one or more different writes to data different than the immutable log.

14. One or more non-transitory, computer-readable storage media, storing program instructions that when executed on or across one or more computing devices cause the one or more computing devices to implement:

receiving a request to access one or more records of an immutable log stored in a non-volatile storage, wherein writes to add further records to the immutable log append the further records to an end portion of the immutable log that is stored in the non-volatile storage and in a volatile storage implementing a separate cache;

determining that the one or more records are located in the end portion of the immutable log stored in the volatile storage and the non-volatile storage, wherein the end portion of the immutable log is stored in the volatile storage implementing the cache at a location indicated by an offset;

determining that the request to access the one or more records comprises a read request to read the one or more records; and in response to determining that the request comprises a read request and that the one or more records are located in the end portion of the immutable log stored implementing the volatile storage, obtaining the one or more records from the volatile storage implementing the cache at the location indicated by the offset; and returning the one or more records in response to the request.

15. The one or more non-transitory, computer-readable storage media of claim 14, storing further instructions that when executed on or across the one or more computing devices cause the one or more computing devices to further implement:

receiving a second request to read a different record from the end portion of an immutable log stored in the non-volatile storage;

determining that the different record is not stored in the cache for the immutable log; and returning the different record obtained from the non-volatile storage.

16. The one or more non-transitory, computer-readable storage media of claim 14, storing further instructions that when executed on or across the one or more computing devices cause the one or more computing devices to further implement:

obtaining a record to append to the immutable log in the non-volatile storage;

writing to the non-volatile storage to append the record to the end portion of the immutable log; and after writing to the non-volatile storage, writing to the cache for the immutable log in the volatile storage to append the record to the end portion of the immutable log.

17. The one or more non-transitory, computer-readable storage media of claim 14, wherein the cache is implemented as a circular memory buffer with a write offset and a read offset.

18. The one or more non-transitory, computer-readable storage media of claim 14, wherein the immutable log describes updates made to a database hosted as part of a database service implemented as part of a provider network, wherein the volatile memory is implemented on a database engine node in the database service, and wherein the non-volatile storage is implemented on one or more storage nodes stored as part of a separate storage service of the provider network.

19. The one or more non-transitory, computer-readable storage media of claim 14, storing further instructions that when executed on or across the one or more computing devices cause the one or more computing devices to further implement disabling the cache for the replication log responsive to a request to disable caching for the replication log received at the database service.

20. The one or more non-transitory, computer-readable storage media of claim 14, storing further instructions that when executed on or across the one or more computing devices cause the one or more computing devices to further implement increasing or decreasing a size of the cache in response to a request.

* * * * *